United States Patent [19]

Shaw

[11] Patent Number: 4,615,654
[45] Date of Patent: Oct. 7, 1986

[54] PORTABLE ROUTER

[75] Inventor: Craig M. Shaw, Orland Park, Ill.

[73] Assignee: Amerock Corporation, Rockford, Ill.

[21] Appl. No.: 646,908

[22] Filed: Aug. 31, 1984

[51] Int. Cl.$^4$ ............................................. B23C 1/20
[52] U.S. Cl. ................................. 409/178; 144/134 D;
144/136 C; 408/115 R; 409/182
[58] Field of Search ................... 409/182, 130, 178;
408/115 R, 72 R, 72 B, 115 B, 241 R, 241 S, 241
G; 144/144 R, 144.5, 144.6 GT, 13 LC, 134 R,
134 D, 136 R; 83/413, 515

[56] References Cited

U.S. PATENT DOCUMENTS

| | | | |
|---|---|---|---|
| 594,902 | 12/1897 | Poertner et al. | 408/115 |
| 2,341,107 | 2/1944 | MacDonald | 408/115 R |
| 3,003,527 | 10/1961 | Fortune | 144/136 R |
| 3,095,915 | 7/1963 | Tesar et al. | 408/115 R X |
| 3,221,784 | 12/1965 | Skollerud | 144/144.5 |
| 3,238,980 | 3/1966 | Goldstein | 408/115 R X |
| 3,442,309 | 5/1969 | Jentsch | 409/182 X |
| 3,450,001 | 6/1969 | Fortune | 409/182 X |
| 3,478,788 | 11/1969 | Zelik | 409/178 X |
| 3,730,236 | 5/1973 | Frydenberg | 144/144 R X |
| 4,031,931 | 6/1977 | Balcombe | 144/136 R X |
| 4,215,731 | 8/1980 | Maynard | 144/136 C |
| 4,281,694 | 8/1981 | Gorman | 144/136 C X |
| 4,330,228 | 5/1982 | Beyl | 408/115 R |
| 4,434,824 | 3/1984 | Bussey | 144/136 C X |
| 4,474,514 | 10/1984 | Jensen | 408/72 B X |

OTHER PUBLICATIONS

Amerock G-70 Portable Frame Routing Machine Operator's Manual, Section D, pp. 1 to 9, 8/1/77.

Primary Examiner—Gil Weidenfeld
Assistant Examiner—Glenn L. Webb
Attorney, Agent, or Firm—Leydig, Voit & Mayer, Ltd.

[57] ABSTRACT

A portable router for cutting slots in a cabinet door to receive wings of hinges includes a router motor and spindle mounted on a slide which moves back and forth on a frame. The latter rests on the door when cutting each slot and is located on the door by a selected one of two guides. The latter are disposed on opposite sides of the spindle and project down beneath the frame into an active position but may be pushed up to a retracted or inactive position. One guide is adapted to engage one end of the door and its spacing from the spindle is correlated with the desired spacing between that end and the adjacent slot. Similarly, the other guide is adapted to engage the other end of the door and locates the spindle for cutting the slot near that end. As the frame is lowered onto the door, the latter engages the inactive guide which thereby is pushed up to its retracted position and the guide drops by gravity to its active position as the router is lifted off the door.

13 Claims, 12 Drawing Figures

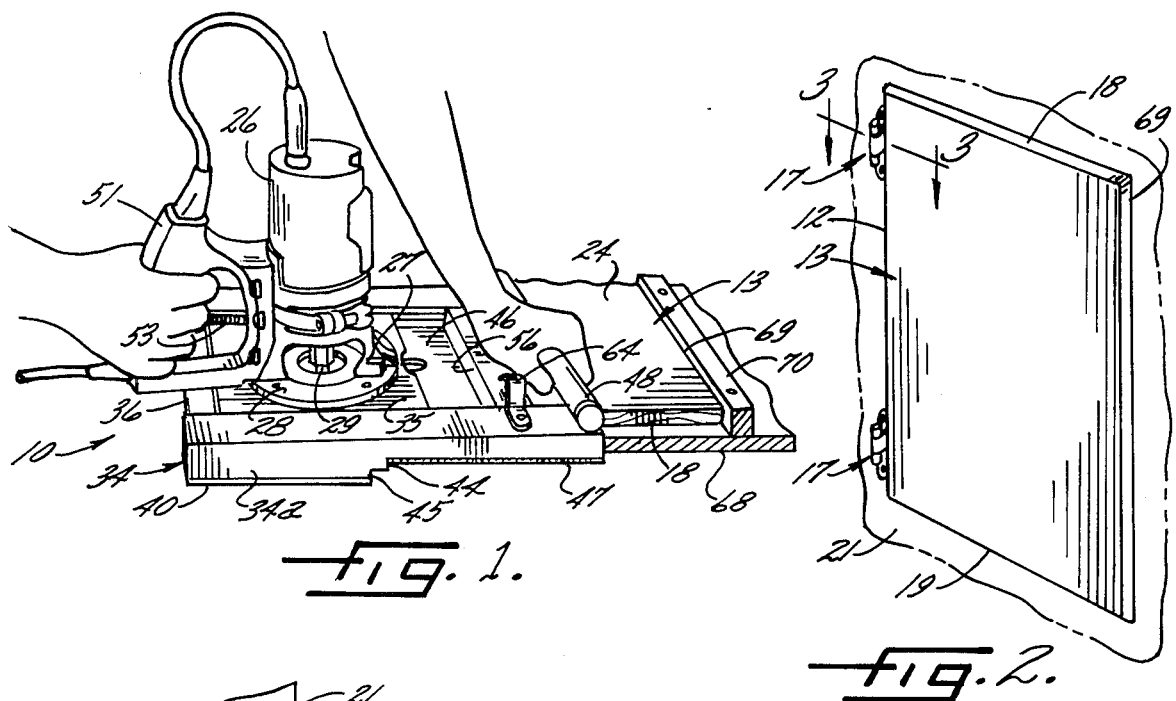
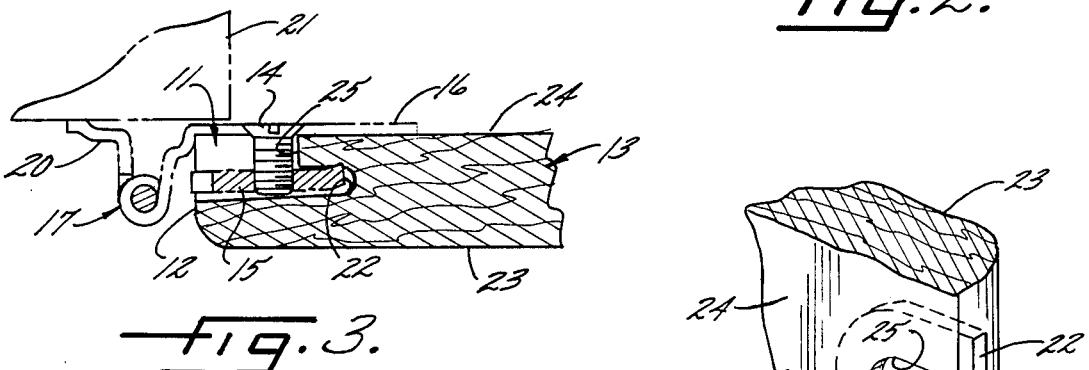
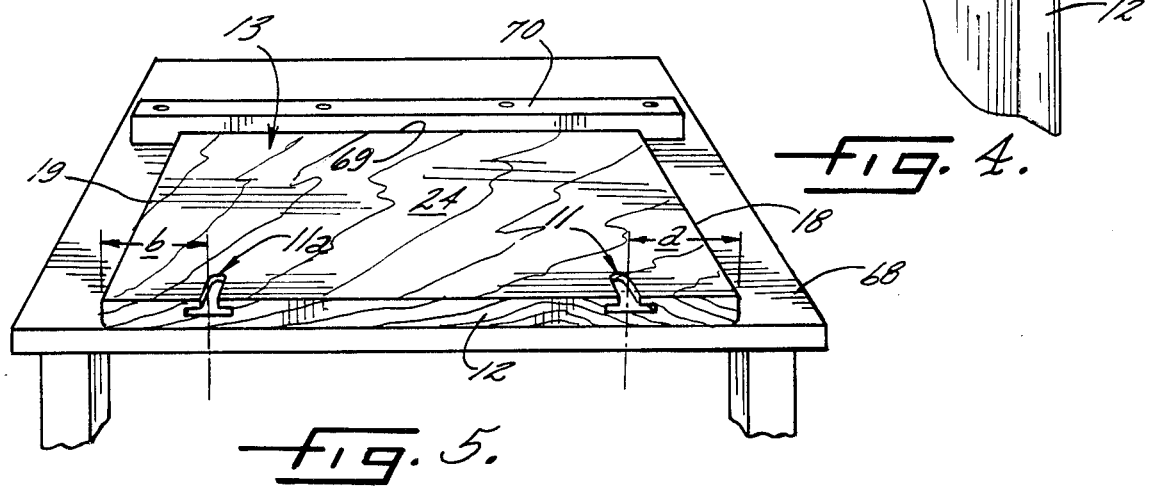

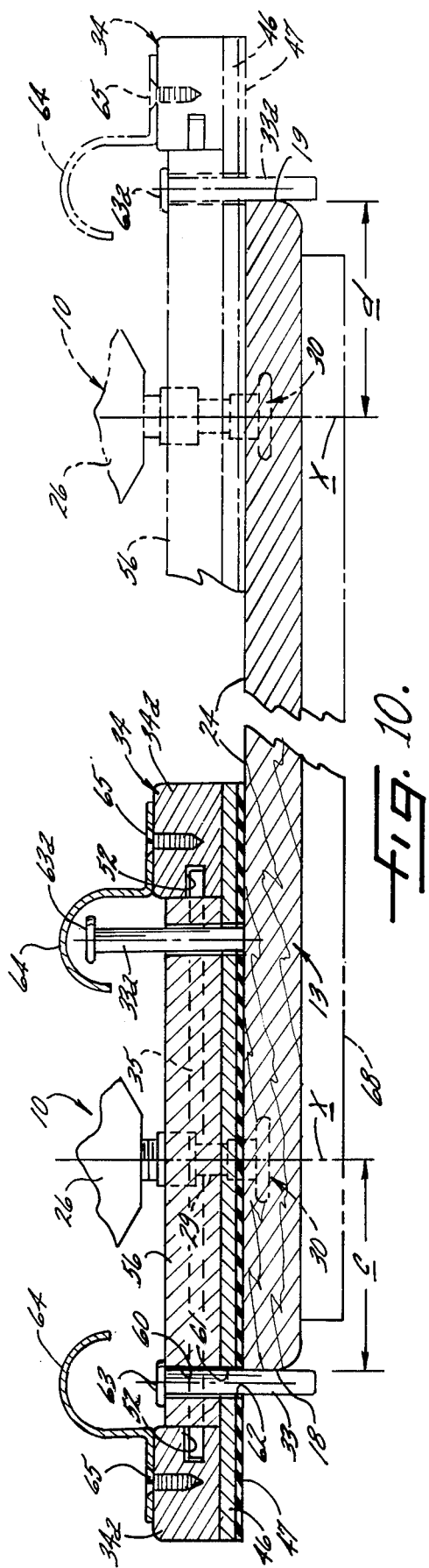
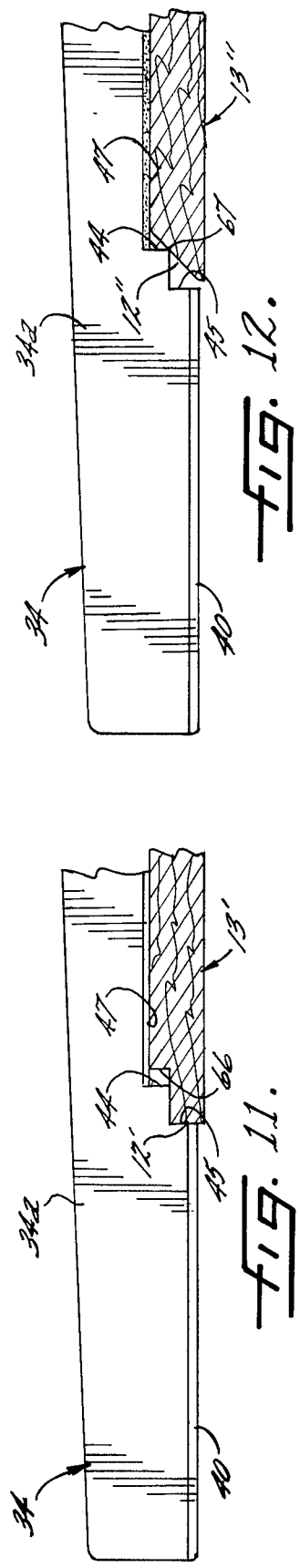

000
PORTABLE ROUTER

BACKGROUND OF THE INVENTION

This invention relates to a router for cutting slots of predetermined shape and size in a workpiece at preselected places on the workpiece. In the case of cabinet doors, for example, the door wings of the hinges which mount the door frequently are disposed in slots in the back of the door and, conventionally, each door is supported by two hinges, one near the upper edge of the door and one near the lower edge. Such slots often are cut by a router designed to cut the slots to the desired shape and size.

SUMMARY OF THE INVENTION

The principal object of the invention is to provide a portable router with a novel arrangement of two guides, one of which is engageable with the one edge of the workpiece while the adjacent slot is cut and the other engageable with another edge while the other slot is cut, and to construct the guides so that the one not being used is automatically retracted to an inactive position as the router is brought into place on the workpiece.

Another object is to project the guides down alongside the spindle of the cutter on opposite sides thereof with the distance between the spindle and each guide being correlated with the corresponding slot from the adjacent end of the workpiece and to mount guides so that the inactive one is pushed up to the inactive position by the workpiece as the router is moved into place for a cut.

The invention also resides in the details of the construction of the guides and their novel cooperation with other parts of the router.

BRIEF DESCRIPTION OF THE DRAWINGS

FIG. 1 is a perspective view of a router embodying the present invention.

FIG. 2 is a perspective view of a cabinet door as a typical workpiece with which the router may be used.

FIG. 3 is an enlarged fragmentary sectional view taken along the line 3—3 in FIG. 2.

FIG. 4 is an enlarged fragmentary perspective view of the door as seen from the back.

FIG. 5 is a perspective view of a work bench with a door in place ready to be routed.

FIG. 10 is a sectional view taken along the line 10—10 in FIG. 8, the position of the router for cutting the other slot being shown in phantom.

FIG. 11 is a view generally similar to FIG. 7 but showing the router as used with a different style of door.

FIG. 12 is a view similar to FIG. 11 but showing the router as used with still a different style of door.

DETAILED DESCRIPTION OF THE PREFERRED EMBODIMENTS

Figure 6:
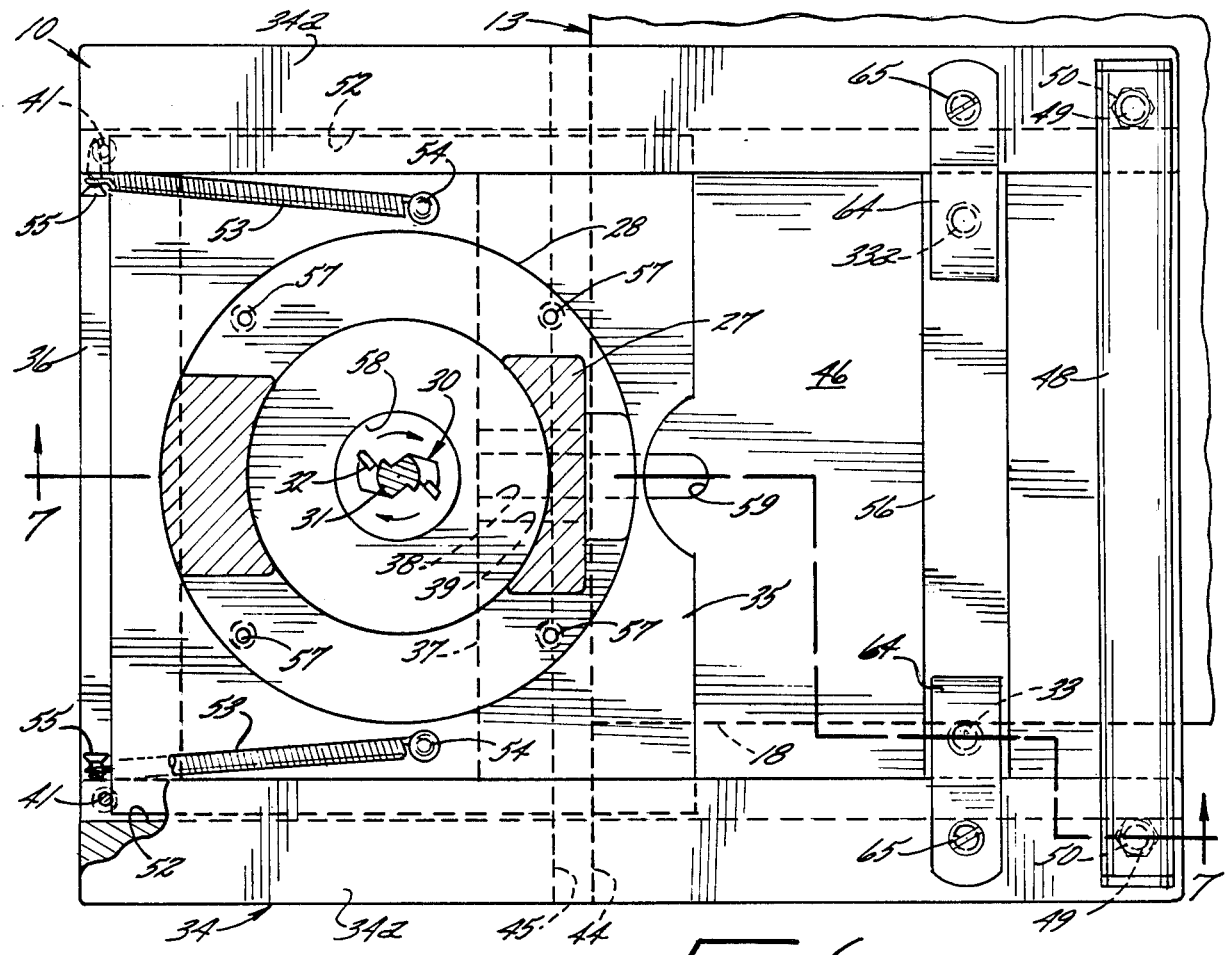
FIG. 6 is an enlarged plan view, parts being broken away and shown in section.

As shown in the drawings for purposes of illustration, the invention is embodied in a portable router 10 for cutting a groove or slot 11 in the back edge 12 of a cabinet door 13 to receive a bolt 14 and a nut 15 which clamp the door wing 16 of a hinge 17 to the door. Two such slots 11 and 11a (FIG. 5) are cut, one below the upper end 18 of the door and one above the lower end 19, and each mounts the wing 16 of a hinge, the other wings 20 of the hinges being fastened to the cabinet frame 21 to support the door for swinging about a vertical axis adjacent its back edge 12. Herein, each slot is T-shaped in cross section (see FIG. 4) with the wider portion 22 being about midway between the front 23 and the back 24 of the door and with the narrower portion 25 opening through the back. The nut 15 is received in the portion 22 while the bolt 14 projects through the wing 16 and the slot portion 25 and is threaded into the nut to clamp the wing against the back of the door. As shown in FIG. 5, the center of the upper slot 11 is spaced from the upper end of the door by a distance a and the center of the lower slot 11a is spaced from the lower end by a distance b. While these two distances customarily are the same, they need not be.

Figure 7:
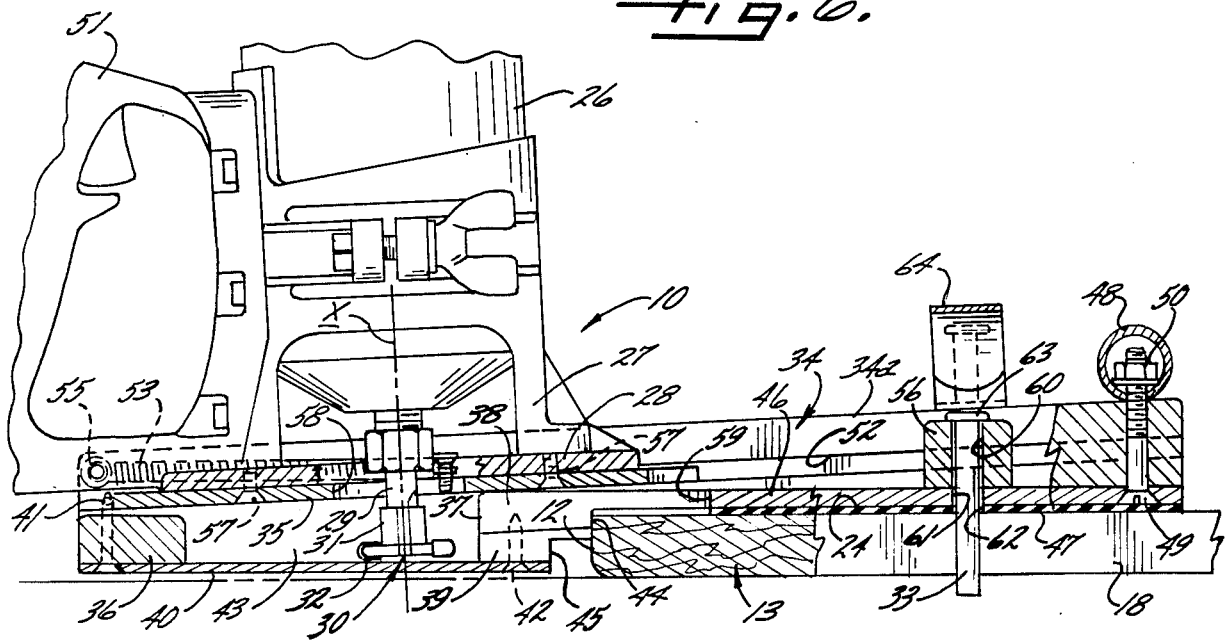
FIG. 7 is a sectional view taken along the line 7—7 in FIG. 6.

The router 10 includes a conventional router motor 26 supported on legs 27 which are attached to an annular base 28. The motor drives a spindle 29 which projects down through the base and carries a cutter 30 (FIG. 7). The latter has two sections with the upper section 31 having a smaller diameter to cut the narrower portion 25 of the slots 11 and 11a and the lower section 32 having a larger diameter to cut the wider portion 22.

The present invention contemplates the provision of a portable router 10 with a novel arrangement of guides which automatically locate the spindle 29 for cutting each of the slots 11 and 11a individually but which do not require any manual adjustments or other manipulation between cuts. To these ends, one guide member 33 is engageable with the upper end 18 of the door 13 and is spaced from the spindle by a distance correlated with the distance a of the slot 11 from the upper end while a second guide member 33a is engageable with the lower end 19 of the door and is spaced from the spindle by a distance correlated with the distance b. Moreover, each guide is automatically retracted to a position out of the way when the other guide is being used and such retraction is effected by the inactive guide engaging a surface of the workpiece such as the back side 24 of the door 13. More specifically, the router includes a frame 34 which is placed on the back of the door and the motor 26 together with the spindle 29 is carried by a slide 35 which is mounted on the frame to move back and forth longitudinally of the slots 11 and 11a. The guides 33 and 33a project down from the frame and the one not being used for the particular cut engages the back of the door as the router is being set in place and is pushed up out of the way to an inactive position.

Herein, the frame 34 is rectangular and includes spaced side rails 34a and an end bar 36 which spans and is secured to the rear ends of the side rails. Intermediate their ends, the latter are spanned by a crossbar 37 (FIG. 7) which, as will be explained later more in detail, is interrupted at its center by a two-section slot 38, 39 to accommodate the spindle 29 and the cutter 30. A plywood sheet 40 is fastened by screws 41 and 42 to the undersides of the end bar and the crossbar to provide an enclosed chamber 43 for the cutter. Along their forward portions, the undersides of the side rails are cut away to provide stepped forwardly facing abutments 44 and 45 and the forward side of the crossbar is similarly cut to provide continuations of these abutments. A second sheet 46 of plywood spans and is bonded to the undersides of the forward portions of the side rails and a thin pad 47 of rubber is cemented to this plywood sheet to protect the surface of the door 13 when the router is in operating position on the back 24 of the door. A handle 48 in the form of a metal tube extends across the front of the frame on top of the side rails and is fastened to the latter by bolts 49 and nuts 50 (FIG. 7). The other handle 51 may be the one conventionally associated with the router motor 26.

Figure 8:
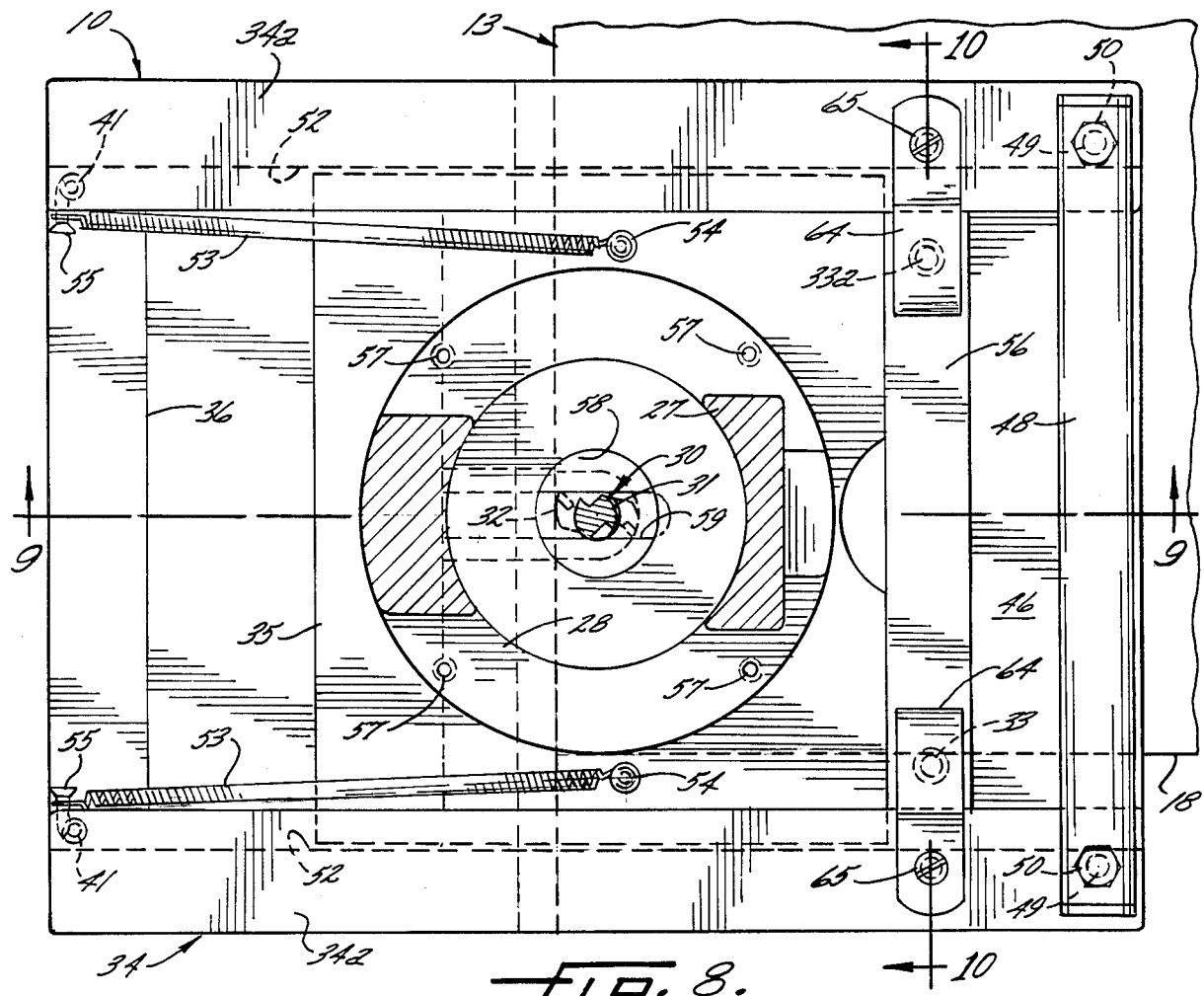
FIG. 8 is a plan view similar to FIG. 6 but showing the parts in a moved position.

The slide 35 is a rectangular board disposed between the side rails 34a with its edges received in opposed longitudinal grooves 52 (FIGS. 7 and 10) on the inner sides of the rails. The slide is appreciably shorter than the side rails so that it may move from its fully retracted position illustrated in FIGS. 6 and 7 to the forward limit position shown in FIGS. 8 and 9. The retracted position is defined by the rear edge of the slide abutting the screws 41 which project up into the grooves 52 and the slide is yieldably urged toward this position by two contractile springs 53 each acting between a post 54 threaded into the top of the slide and a similar post 55 threaded into the inner side of a rail 34a adjacent the rear end thereof. The slide is moved forward against the action of these springs and the forward limit position is defined by a stop 56 in the form of a transverse bar disposed between the side rails and cemented in place on top of the plywood sheet 46 where it is abutted by the forward end of the slide.

The motor 26 is centrally located on top of the slide 35 with the base 28 fastened to the latter by screws 57 (FIGS. 6 and 7) and the spindle 29 projects down into the chamber 43 through a circular hole 58 in the slide, the cutter 30 being secured to the lower end of the spindle. The spindle and the upper section 31 of the cutter move freely through a slot 59 in the plywood sheet 46 and through the upper portion 38 of the slot in the crossbar 37 as the slide moves forward and, at the same time, the lower and larger section 32 of the cutter moves through the lower portion 39 of this slot. With the hinge 17 illustrated in the drawings, it is desirable to have the slots 11 and 11a in the door 13 inclined slightly toward the back 24 of the door as shown in FIG. 3 and, to achieve this, the grooves 52 in the side rails 34a are inclined upwardly a corresponding amount so that the slide 35 and hence the cutter 30 ride upwardly as the slide is moved forward.

In the present instance, each of the guide members 33 and 33a is a cylindrical metal dowel or pin projecting loosely through the frame 34 in a vertical direction so that the pin normally extends beneath the frame for engagement with the workpiece but may be retracted to an inactive position above the workpiece. Specifically, the guide pin 33 slides freely in a hole 60 in the stop bar 56 and holes 61 and 62 in the sheet 46 and pad 47 respectively and these holes are perpendicular to the underside of the pad so that the pin is perpendicular to the workpiece when the router is in place on the latter. The pin 33a is similarly mounted on the frame with the pins being at opposite sides of the frame so as to engage respectively, for example, the upper and lower ends 18 and 19 of the door 13. As shown in FIG. 10, the guide pin 33 is located so that the distance c from its inner side to the centerline x of the spindle 29 is equal to the distance a between the upper edge 18 of the door and the center of the upper slot 11. Similarly, the distance d between the spindle centerline and the inner side of the guide pin 33a is the same as the distance b between the lower door edge 19 and the center of the slot 11a. Herein, the guide pins drop to their active positions by gravity and, to limit the downward movement of the pins, the latter are formed with heads 63 and 63a which abut the stop bar 56. When the router is placed on the door preparatory to cutting one of the slots, the inactive pin engages the door back 24 and lifts up relative to the frame 34 as illustrated by the full line position of the pin 33a in FIG. 10. To prevent the guide pins from falling out of their respective holes, sheet metal guards 64 are fastened to the side rails 34a by screws 65 and project in over the pins, the spacing between each pin and its associated guard being less than the length of the pin.

Figure 9:
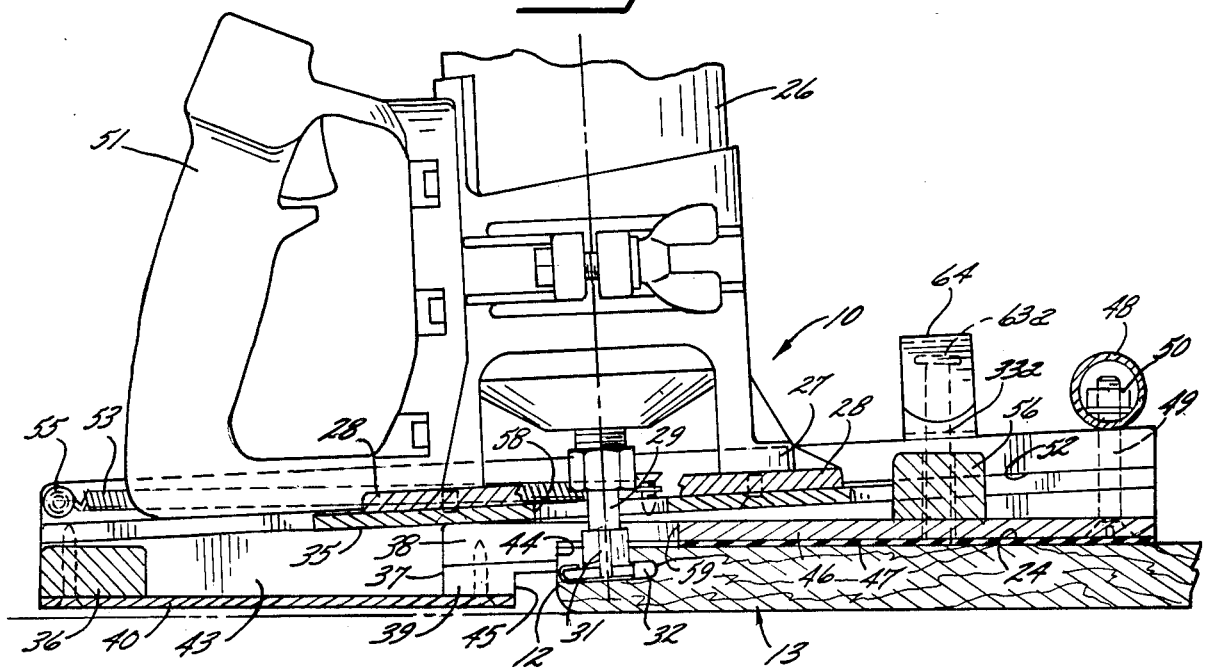
FIG. 9 is a sectional view taken along the line 9—9 in FIG. 8.

In cutting the slots 11 and 11a of a door 13 which has a back edge 12 perpendicular to the back 24 of the door as illustrated in FIGS. 7 and 9, the upper abutment 44 on the rails 34a and the crossbar 37 is placed against the back edge of the door in positioning the router 10. In the case of an inset door 13' (FIG. 11), the back edge 12' is cut away as indicated at 66 and, accordingly, the lower abutment 45 is used. With a reverse bevel door 13" (FIG. 12), the corner 67 at the lower edge of the upper abutment engages the beveled back edge 12" of the door to locate the router.

In use, a door 13 to be routed is placed back side 12 up on a work bench 68 (FIG. 5) with the front edge 69 of the door against a stop 70 on the top of the bench and the back edge 12 at the front of the bench. Then, if the upper slot 11 is to be cut first, the router 10 is placed on the back of the door with the abutment 44 behind the back edge of the door and the guide 33 hanging down near the upper edge 18, the guide 33a having engaged the door back and been pushed up to its retracted position as shown in full lines in FIG. 10. Next, the router is slid on the back of the door until the guide 33 bears against the upper edge of the door and the abutment 44 is against the back edge. With both of the handles 48 and 51 held by the operator, the motor 26 is energized and pushed forwardly. As a result, the slide 35 moves in the grooves 52 until it abuts the stop bar 56 and this feeds the cutter 30 into the door and cuts the slot 11. The operator then lifts the router and repositions it on the door with the guide 33a hanging alongside the lower edge 19 of the door and the guide 33 retracted and the procedure is repeated to cut the slot 11a. The router may, if desired, be used to cut a slot between the slots 11 and 11a in which case both guides are in the retracted position and the proper location of the router is obtained by visual sighting.

I claim:

1. A portable router for cutting a first groove in a flat workpiece at a first preselected distance from one end of the workpiece and adapted to be physically re-positioned in space relative to the workpiece to cut a second and similar groove in the workpiece at a second preselected distance from the other end thereof, said router having, in combination, a portable frame adapted to rest on a flat surface of the workpiece, a slide mounted on said frame to slide back and forth on the frame in a direction which corresponds to the longitudinal centerlines of the grooves to be cut, a power-actuated spindle mounted on said slide to move bodily therewith and adapted to carry a cutter for cutting a groove as the slide moves on the frame, a first guide member mounted on said frame to project along one side of said spindle and engage said one end of said workpiece while said cutter cuts said first groove, said first guide member being spaced from said spindle a distance corresponding to said first preselected distance whereby said cutter is properly positioned to cut said first groove, and a second and similar guide member mounted on said frame to project along the other side of said spindle and engage said other end of said workpiece while said cutter cuts said second groove, said second guide member being spaced from said spindle a distance corresponding to said second preselected distance whereby said cutter is properly positioned to cut said second groove, said guide members being mounted for free movement on said frame to retract freely upon engagement with said flat surface of said workpiece whereby each member is out of the way when the other engages the associated end of the workpiece.

2. A router as defined in claim 1 in which said preselected distances are the same and the spacing between said second guide member and said spindle is the same as the spacing between said first guide member and said spindle.

3. A router as defined in claim 1 in which said guide members move vertically in said frame between a lower active position and an upper retracted position and the guide members normally move down by gravity to the active position.

4. A router as defined in claim 3 including means to limit movement of said guide members in both the upward and the downward directions.

5. A router as defined in claim 1 including means to limit movement of said slide on said frame in both the forward and backward directions.

6. A router as defined in claim 5 in which said cutter cuts on the forward movement of said slide and yieldable means urge the slide backward.

7. A portable router for cutting a first groove in a side edge of a flat workpiece at a first preselected distance from one end of the workpiece and adapted to be physically re-positioned in space relative to the workpiece to cut a second and similar groove in said side edge at a second preselected distance from the other end of the workpiece, said router having, in combination, a portable frame adapted to rest on a flat surface of the workpiece and having an elongated abutment engageable with said side edge of the workpiece, a slide mounted on said frame to slide back and forth on the frame in a direction perpendicular to said abutment, a power-actuated spindle mounted on said slide to move bodily therewith and adapted to carry a cutter for cutting a groove as the slide moves on the frame, a first guide member mounted on said frame to project down along said spindle and laterally spaced from the spindle on one side thereof to engage said one end of said workpiece while said cutter cuts said first groove, said first guide member being spaced from said spindle a distance corresponding to said first preselected distance whereby said cutter is properly positioned to cut said first groove, and a second and similar guide member mounted on said frame to project down along said spindle and laterally spaced from the spindle on the other side thereof to engage said other end of said workpiece while said cutter cuts said second groove, said second guide member being spaced from said spindle a distance corresponding to said second preselected distance whereby said cutter is properly positioned to cut said second groove, said guide members being mounted on said frame for free movement to slide vertically and to retract upwardly upon engagement with said flat surface of said workpiece whereby each member is out of the way when the other engages the associated end of the workpiece.

8. A router as defined in claim 7 in which said abutment includes at least one horizontally facing elongated surface.

9. A router as defined in claim 8 in which said abutment includes two horizontally facing elongated surfaces with one surface above the other and with the lower surface behind the upper surface to accommodate workpieces with side edges of different configurations.

10. A portable router for cutting a first groove in a side edge of a flat workpiece at a first preselected distance from one end of the workpiece and adapted to be physically re-positioned in space relative to the workpiece to cut a second and similar groove in said side at a second preselected distance from the other end of the workpiece, said router having, in combination, a portable frame including first and second parallel side rails and a plurality of transverse cross members rigidly connecting said side rails, said side rails having under surfaces adapted to rest on a flat horizontal surface of said workpiece, and said frame having an elongated abutment extending perpendicularly to said side rails to engage said side of said workpiece, a slide supported by said side rails to move on the latter in a direction generally perpendicular to said abutment, a generally vertical power-actuated spindle mounted in said slide between said side rails to move bodily therewith and adapted to carry a cutter for cutting a groove as the slide moves on said side rails, a first elongated guide member extending vertically through said frame adjacent said first side rail to project down along said spindle and engage said one end of said workpiece while said cutter cuts said first groove, the lateral spacing between said first guide member and said spindle corresponding to said first preselected distance whereby said cutter is properly positioned to cut said first groove, a second and similar elongated guide member extending vertically through said frame adjacent said second rail to project down along said spindle and engage said other end of said workpiece while said cutter cuts said second groove, the lateral spacing between said first guide member and said spindle corresponding to said first preselected distance whereby said cutter is positioned properly to cut said second groove, said guide members sliding freely in a vertical direction in said frame to retract upwardly upon engagement with said flat surface of said workpiece whereby each member is out of the way when the other engages the associated end of the workpiece, and means limiting the vertical sliding of said guide members in each direction.

11. A router as defined in claim 10 in which said guide members slide by gravity in said frame.

12. A router as defined in claim 11 in which said means limiting sliding of said guide members comprises enlarged heads formed on the upper ends of the guide members and guards rigidly mounted on said frame and overlying said heads, said guards normally being spaced above said heads to permit said guide members to retract.

13. A router as defined in claim 10 in which the direction of movement of said slide also is inclined relative to the under surfaces of said side rails whereby the grooves cut by said cutter are inclined relative to said flat horizontal surface of said workpiece.

* * * * *